United States Patent [19]

Vogl

[11] Patent Number: 4,641,303
[45] Date of Patent: Feb. 3, 1987

[54] METHOD AND CIRCUIT ARRANGEMENT FOR THE TRANSMISSION OF DATA SIGNAL BITS OCCURRING WITH A FIRST BIT RATE IN A BIT STREAM HAVING A SECOND BIT RATE WHICH IS HIGHER THAN THE FIRST BIT RATE

[75] Inventor: Herbert Vogl, Munich, Fed. Rep. of Germany

[73] Assignee: Siemens Aktiengesellschaft, Berlin and Munich, Fed. Rep. of Germany

[21] Appl. No.: 717,810

[22] Filed: Mar. 29, 1985

[30] Foreign Application Priority Data

Mar. 30, 1984 [DE] Fed. Rep. of Germany ....... 3411881

[51] Int. Cl.⁴ ............................. H04J 3/22; H04B 1/66
[52] U.S. Cl. ........................................ 370/84; 375/122
[58] Field of Search .................... 370/84, 85; 375/121, 375/122

[56] References Cited

U.S. PATENT DOCUMENTS

| | | | |
|---|---|---|---|
| 3,652,800 | 3/1972 | Dooley | 370/84 |
| 3,652,802 | 3/1972 | Schellenberg | 370/84 |
| 4,224,473 | 9/1980 | Kaul et al. | 370/84 |
| 4,471,480 | 9/1984 | Haussman et al. | 370/84 |

Primary Examiner—Douglas W. Olms
Assistant Examiner—Frank M. Scutch, III
Attorney, Agent, or Firm—Hill, Van Santen, Steadman & Simpson

[57] ABSTRACT

For the transmission of data signal bits occurring with a first bit rate from a transmission device by way of a transmission link to a receiving device in a bit stream having a second bit rate which is higher in comparison to the first bit rate, the data signal that is to be transmitted are combined in the transmission device with additional filler bits to form envelopes respectively comprising a prescribed plurality of bits, this being executed given non-transgression of the prescribed bit rate difference between the first bit rate and the second bit rate. The envelopes are transmitted via the transmission link with the second bit rate. Given transgression of the prescribed bit rate difference, the data signal bits, with first bit groups identifying the same as belonging to data signal envelopes, are combined with bits of separate envelopes which respectively contain a second bit group identifying them as blank envelopes and are transmitted via the transmission link with the second bit rate.

11 Claims, 5 Drawing Figures

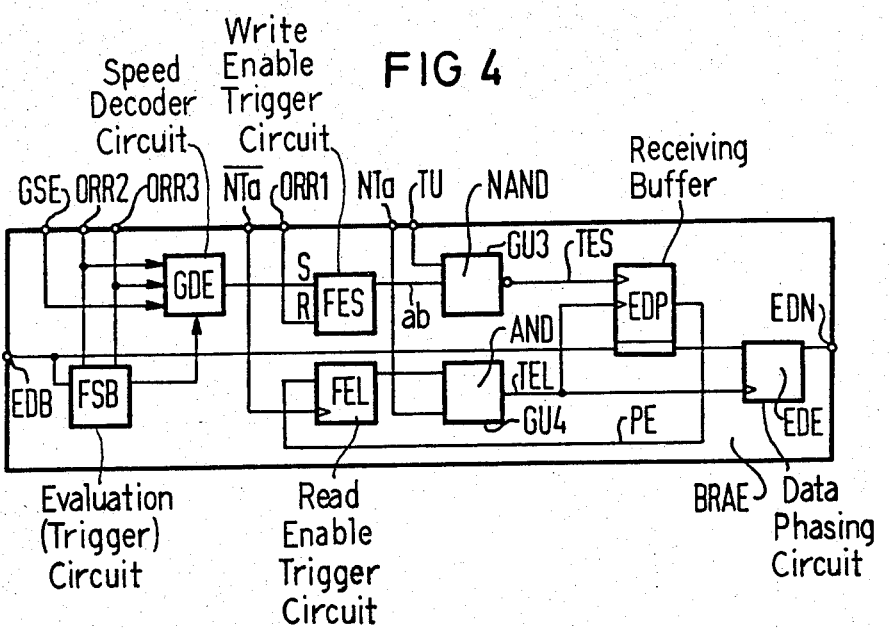
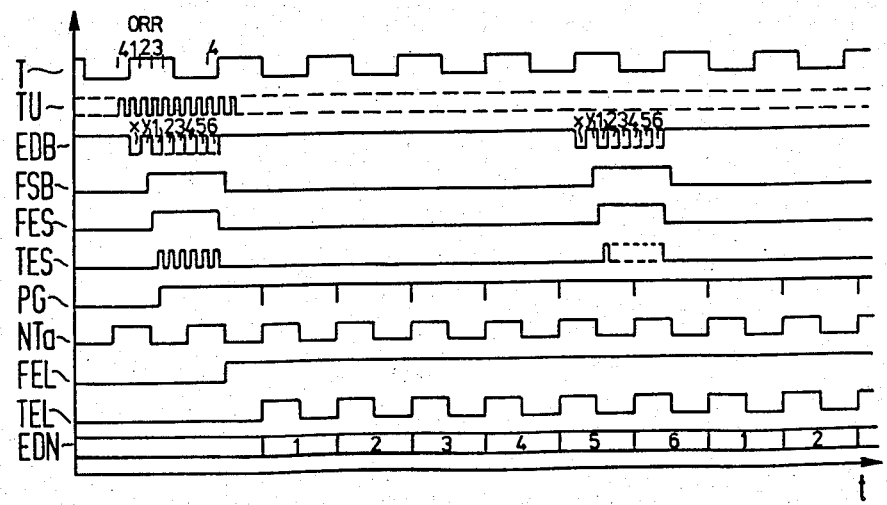

METHOD AND CIRCUIT ARRANGEMENT FOR THE TRANSMISSION OF DATA SIGNAL BITS OCCURRING WITH A FIRST BIT RATE IN A BIT STREAM HAVING A SECOND BIT RATE WHICH IS HIGHER THAN THE FIRST BIT RATE

BACKGROUND OF THE INVENTION

1. Field of the Invention

The present invention relates to a method and to a circuit arrangement for the transmission of data signal bits occurring with a first bit rate from a transmission device by way of a transmission link to a receiving device in a bit stream having a second bit rate higher in comparison to the first bit rate.

2. Description of the Prior Art

It is already known in the art, for example from the German application No. P 33 11 030.1, fully incorporated herein by this reference, in the context considered above, to insert a separate bit rate adaptation circuit into the transmission link for the transmission of the data signal bits, this circuit allowing a matching between the bit streams incoming or, respectively, outgoing with different bit rates to be undertaken. Nothing regarding the detail structure of the appertaining bit rate adaptation circuit is known, however, in the associated context.

SUMMARY OF THE INVENTION

The object of the present invention, accordingly, is to provide a manner in which one can proceed in a relatively simple manner in order to transmit data signal bits occurring with a first bit rate from a transmission device to a receiving device in a bit stream having a second bit rate higher in comparison to the first bit rate and thereby guaranteeing, at the same time, that the data signal bits are also correctly recognized in the receiving device.

Given a method for the type set forth above, the object of the present invention is achieved, according to the invention, in that, in the transmission device, given nontransgression of a prescribed bit rate difference between the first bit rate and the second bit rate, the data signal bits to be transmitted are combined with additional filler bits to form envelopes respectively encompassing a prescribed plurality of bits, these envelopes being identified as data signal envelopes by the filler bits belonging to a first bit group, and are transmitted over the transmission length with the second bit rate, and, given transgression of the aforementioned prescribed bit rate difference between the first bit rate and the second bit rate, the bits of the first bit group identifying the data signal bits as belonging to data signal envelopes are combined with bits from separate envelopes which respectively contain second bit groups identifying them as blank envelopes and are transmitted by way of the transmission length with the second bit rate. In the receiving device, on the basis of the respectively identified first bit group, only the data signal bits transmitted together with this group are acquired from the bit stream transmitted via the transmission link are forwarded with the first bit rate.

The present invention provides the advantage that data signal bits that appear with a first, relatively slow bit rate can be transmitted in a manner that is relatively simple overall and a bit stream which has a bit rate which is higher in comparison to the first bit rate. Of particular advantage thereby is that divisor-external bit rates can also definitely be taken into consideration as a first bit rate and a second bit rate without a loss of information occurring in the course of the data signal bit transmission from the transmission device to the receiving device.

Advantageously, the first bit group is formed either by a standard bit or by two different bits and the second bit group, by contrast, is formed by two identical bits. The advantage thereby derives that one can manage with a particularly low control expense for the identification and discrimination of two bit groups.

It is advantageous for implementation of the method of the invention to utilize a circuit arrangement comprising a transmission device which accepts data signal bits with a first bit rate and outputs the same via a transmission link having a higher, second bit rate in comparison to the first bit rate and comprising a receiving device which is connected to the transmission device via the transmission link and which, in response to the reception of the data signal bits appearing with the second bit rate, emits corresponding data signal bits at the first bit rate. This circuit arrangement, according to the present invention, is characterized in that the transmission device comprises a transmission data buffer into which the data signal bits of the first bit rate can be written and from which the data signal bits of the second bit rate can be read and output onto the transmission link, in that the transmission device comprises a bit group emission device which, respectively before or after the reading of a fixed plurality of bits from the transmission data buffer, emits a fixed bit group from at least two different bit groups for a transmission via the transmission link, whereby the one bit group, together with its bits transmitted from the transmission data buffer, is identified as belonging to a data signal envelope, whereas the other bit group, together with its bits transmitted from the transmission data buffer, is identified as to belonging to a blank envelope, and in that a control arrangement is provided in the transmission device which, after the respective identification of the fixed plurality of data signal bits to be accommodated in an envelope, produces a control signal for the reading of the appertaining bits from the transmission data buffer and controlling the emission of the one or the other of the bit groups before or after reading. Further, the receiving device comprises a receiving data buffer which is controlled by a controller arrangement such that only the data signal is transmitted via the transmission link with the second bit rate and respectively identified as belonging to a data signal envelope can be written into and such that the appertaining data signal bits can be read from the same with the first bit rate. The advantage thereby arises of a relatively low circuit expense both in the transmission device as well as in the receiving device in order to transmit data signal bits appearing with the first bit rate in a bit stream whose bits appear with a second, higher bit rate in comparison to the first bit rate.

The controller arrangement belonging to the transmission device advantageously comprises a counter with whose assistance the plurality of data signal bits to be respectively accommodated in an envelope is counted and which controls the reading of data signal bits previously deposited in the transmission data buffer and the transmission of a first or, respectively, second bit group of the bit group transmission device. The advantage achieved is a relatively low circuit expense for the realization of the controller arrangement.

The controller arrangement belonging to the transmission device, moreover, preferably comprises a phase matching device which controls the times of reading of the bits stored in the transmission data buffer. This measure contributes to a disruption-free execution of the data signal bit transmission in a particularly effective manner.

Further, the controller arrangement belonging to the transmission device also comprises a signal emission device controlled by the counter and whose signals define the time ranges within which a data signal envelope or, respectively, a blank envelope can be emitted. Thereby achieved is a particularly low circuit expense with respect to the definition of the time ranges within which the individual envelopes are to be output.

The controller arrangement belonging to the receiving device advantageously comprises a bit group evaluation device and a signal transmission device which controls the writing or, respectively, reading of the respective data signal bits into or, respectively, out of the receiving data buffer. The advantage thereby arises of a relatively low circuit expense for the realization of the controller arrangement belonging to the receiving device.

The latter signal transmission means preferably outputs its write or, respectively, read signals via a logic element arrangement to which clock pulses with the second or, respectively, with the first bit rate are supplied. The respectively required selection of the receiving data buffer is thereby assured in a relatively simple manner.

The controller arrangement belonging to the receiving device, moreover, comprises a counter which defines the times at which the data signal bits are capable of appearing in the individual envelopes. Advantageously, therefore, the individual, occurring data signal bits can be reliably acquired and accepted in the appertaining receiving device.

Also advantageous, finally, is that the controller arrangement belonging to the transmission device as well as that belonging to the receiving device comprises a respective speed decoder which, in response to the feed of the signal pertaining to the first bit rate, allows the appertaining signal transmission device for the reading of the data signal bits from the transmission data buffer or, respectively, for the writing of data signal bits into the receiving data buffer to be effectively controlled. The advantage thereby derives that a setting of the controller arrangements in the transmission device and in the receiving device to the first bit rate respectively used can occur in a relatively simple manner.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 4 is a block diagram of one embodiment of a bit rate matching circuit belonging to a receiving device of the circuit arrangement illustrated in FIG. 1; and FIG. 5 is a pulse diagram showing the progression of pulses appearing at various circuit points of the circuit arrangement illustrated in FIG. 4.

DESCRIPTION OF THE PREFERRED EMBODIMENTS

Figure 1:
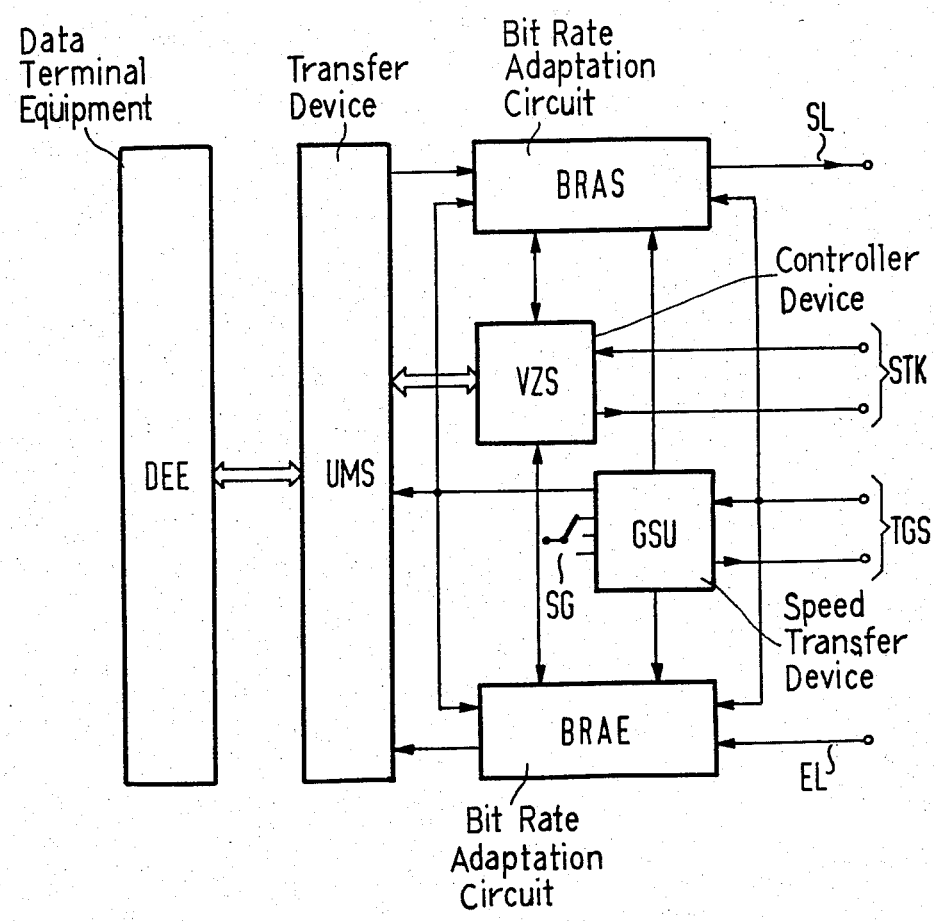
FIG. 1 is a block diagram of a circuit arrangement in which the present invention is applied in bit rate matching circuits.

Referring to FIG. 1, a circuit arrangement is illustrated with whose assistance data signal bits are transmitted between a data terminal equipment DEE and a transmission link. The data terminal equipment DEE can be any data terminal equipment which is capable of both outputting and receiving data signal bits. The appertaining data terminal equipment DEE can, for example, be connected to the circuit arrangement illustrated in FIG. 1 via an interface according to CCITT Recommendation X21.

According to FIG. 1, the data terminal equipment DEE is connected to a transfer device UMS whose significance shall become apparent below. A bit rate matching or adaptation circuit BRAS belonging to a transmission device and a bit rate adaptation circuit BRAE belonging to a receiving device are connected to the transfer device UMS. The bit rate adaptation circuit BRAS is connected at its output to a transmission line SL of the transmission link. The bit rate adaptation circuit BRAE is connected at its input to a receiving line EL, likewise belonging to the transmission link.

The two bit rate adaptation circuits BRAS, BRAE are also connected to an exchange-oriented auxiliary controller device VZS which may be connected a separate control channel STK to a central controller arrangement and transmits control signals both two and from the same. Further, the appertaining exchange-oriented auxiliary controller device VZS is also connected to the transfer device UMS.

The two bit rate adaptation devices BRAS, BRAE also have control inputs connected to a speed transfer device GSU which allows the respective transmission speed to be set via a setting switch SG and which is capable of accepting clock and speed signals via a clock signal channel TGS and of outputting station signals via the same channel TGS. The appertaining signals are also supplied to the bit rate adaptation circuits BRAS, BRAE. At a discrete output, the speed transfer device GSU also outputs so-called net clock signals for both the data terminal equipment DEE (via the transfer device UMS) and the bit rate adaptation circuits BRAS and BRAE.

The circuit arrangement considered above and illustrated in FIG. 1 is basically capable of operating in such a manner as the known circuit arrangement initially considered. Accordingly, the exchange-oriented auxiliary controller device VZS monitors the connection status of the data terminal equipment DEE and controls the call setup in response to a connection request outgoing from the appertaining data terminal equipment. During the actual data transmission phase, the exchange-oriented auxiliary controller device VZS switches the data paths to and from the data terminal equipment DEE via the transfer device UMS such that connections are set up between the appertaining data terminal equipment VEE and the two bit rate adaptation circuits BRAS, BRAE. Moreover, the controller arrangement VZS enables the data transmission mode after the speed setting has been accomplished.

Figure 2:
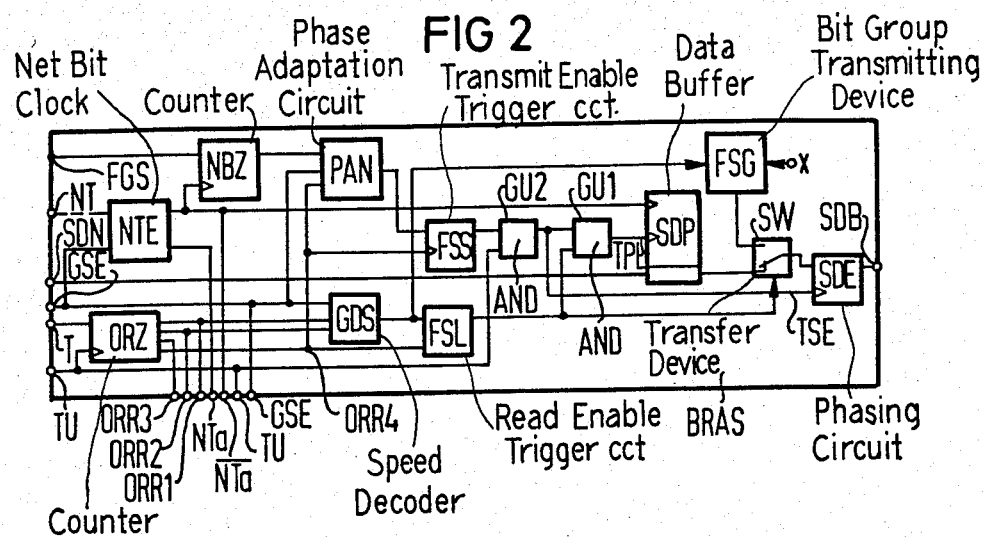
FIG. 2 is a block diagram of the detailed structure of a bit rate matching circuit belonging to a transmission device of the circuit arrangement illustrated in FIG. 1.

FIG. 2 illustrates, in block diagram form, an embodiment of the bit rate adaptation device BRAS shown in FIG. 1 which belongs to a transmission device. As an essential component, the circuit arrangement illustrated in FIG. 2 comprises a transmission data buffer SDP which has a clock input connected to a net bit clock generating circuit NTE to which speed setting signals are supplied at its input side from an input GSA and the net clock pulses are supplied from an input NT, the course of these net clock pulses being illustrated in FIG. 3 in the line referenced NT. Let the net bit clock generating circuit NTE be designed such that it outputs clock pulses at its output corresponding to the appertaining clock pulses NT or, respectively, clock pulses inverted with respect thereto, these clock pulses appearing at the output terminal NTa or, respectively, $\overline{NTa}$.

The transmission data buffer SDP has its data signal bit input directly connected to a transmission data terminal SDN at which the data signal bits to be transmitted appear with the net bit clock rate.

The transmission data buffer SDP has a read input connected by way of a control line TPL to the output of an AND gate GU1 which has an input connected to the output of a further AND gate GU2. The AND gate GU2 has an input connected to a transmit enable trigger circuit FSS. The other input of the AND gate GU2 is connected to a terminal TU of the bit rate adaptation BRAS. Clock pulses serving for the bit transmission appear at this terminal TU.

The AND gate GU1 has its other input connected to the output of a read enable trigger circuit FSL to whose output the actuation input of a transfer device SW is connected, the transfer device SW, in its one switch position, connecting a signal input of a transmission data phasing circuit SDE to the output of the transmission data buffer SDP and, in its other switch position, connecting the signal input of the phasing circuit SDE to the output of a bit group transmission device FSG. The phasing circuit SDE has its clock input connected to the output of the AND gate GU2. The output of the phasing circuit SDE is connected to an output terminal SDP of the bit rate adaptation circuit BRAS which outputs the transmission data with the net clock rate. The transmission line SL mentioned in conjunction with FIG. 1 is connected to the output SDB.

The aforementioned transmit enable trigger circuit FSS has its clock input connected to an output 4 of a counter ORZ together with the reset input R of the read enable trigger circuit FSL. In the present case, the counter is also referred to as an octet frame counter since it has executed a counting cycle in response to respectively eight clock pulses appearing at the terminal TU, this counting cycle serving for the definition of eight bit times of which the output counter pulses appearing at the bit times 1, 2, 3 and 4 appear at correspondingly referenced outputs of the counter ORZ. The pulses appearing at the outputs 1, 2 and 3 of the counter ORZ, moreover, are supplied to separate terminals ORR1, ORR2 and ORR3 of the bit rate adaptation circuit BRAS. As proceeds from FIG. 2, the counter ORZ is controlled at its input both by the clock pulses appearing at the terminal T, these appearing, for example, with a bit rate of 8 kHz, as well as by the clock pulses appearing at the terminal TU which, for example, appear with a clock rate 64 kHz. The transmit enable trigger circuit FSS has its signal input connected to the output of a phase adaptation circuit PAN which may be a flip-flop in the present case which has its reset input R connected to the output 4 of the above-mentioned counter ORZ and which has its setting inputs combined in accordance with an OR function and connected, on the one hand, to the speed setting terminal GSE of the bit rate adaptation circuit BRAS and, on the other hand, to the output of a net bit rate counter NBZ which has its clock input connected to the output $\overline{NTa}$ of the net bit clock generating circuit NTE and its signal or, respectively, enable input connected to a transmit enable terminal FGS of the bit rate adaptation circuit BRAS. The counter NBZ therefore counts the clock pulses output from the net bit clock generating circuit NTE.

The read enable trigger circuit FSL has its setting input S connected to the output of a speed decoder circuit GDS which has its input connected to the outputs 1 and 2 of the aforementioned counter ORZ, as well as to the speed setting terminal GSE.

Also connected to the speed decoder circuit GDS is a control input of the aforementioned bit group generating or, respectively, transmitting device FSG. Control information is supplied by way of this connection to the bit group transmitting device FSG concerning which bit group is to be readied at its output for transmission. The bit group transmitting device FSG is also capable of accepting separate control information for the transmission of signaling criteria, these signals being accepted from a separate control terminal X.

Figure 3:
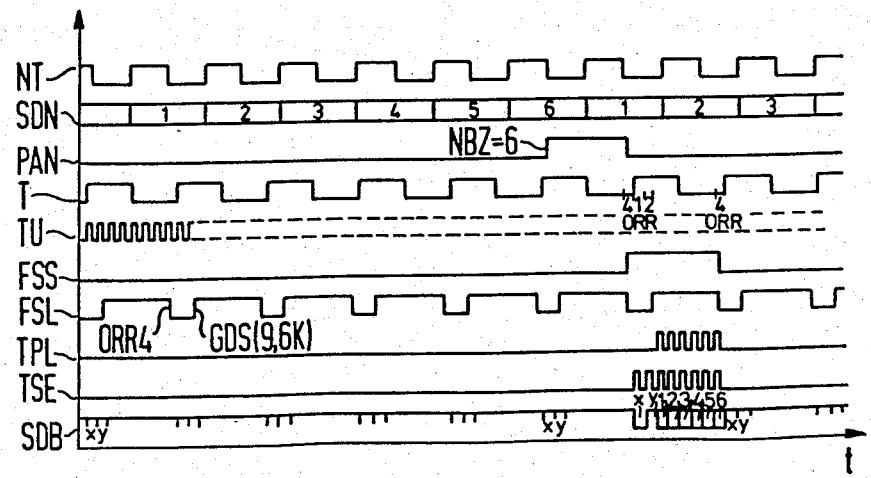
FIG. 3 is a pulse diagram illustrating the progression of pulses appearing at the various circuit points of the circuit arrangement illustrated in FIG. 2.

The structure of the circuit arrangement shown in FIG. 2 having been explained above, the manner of operation of the circuit arrangement will be considered in greater detail below with reference to pulse diagram of FIG. 3. In this context, it should again be pointed out that, in the pulse diagram of FIG. 3, the lines having reference characters correspond to the circuit points or lines with the same reference characters in FIG. 2. Where the pulses shown in FIG. 3 specifically appear in the circuit arrangement shown in FIG. 2 is what is intended to be specifically set forth.

The transmission data appearing in the rhythm of the clock pulses NT, for example appearing at the terminal SDN with a frequency of 9.6 kHz, are written into the transmission data buffer SDP controlled by the clock pulses NT. At the same time, the net bit frame counter NBZ counts the clock pulses NT in order to emit a setting signal to the trigger circuit PAN which a prescribed count (the count 6 in the present case) is reached, the trigger circuit or adaptation circuit PAN being responsive to output the signal indicated in FIG. 3 on the line referenced PAN. The transmit enable trigger FSS is set with the resetting of the circuit PAN by an output signal supplied to its reset input R from the output of the counter ORZ. The output signal of the trigger circuit FSS causes the clock pulses to be transmitted from the terminal TU via the AND gate GU2 which is now open. These clock pulses proceed, on the one hand, via the line TSE to the clock input of the trigger circuit SDE. The signal output by the trigger circuit FSS has such a width that, in the present case, eight clock pulses proceed from the terminal TU to the clock input of the trigger circuit SDE. Of these eight clock pulses appearing at the output of the AND gate GU2, only the last six proceed via the AND gate GU1 and the line TPL to the read input of the transmission data buffer SDP. To that end, a corresponding control signal is supplied to the AND gate GU1 from the output of the trigger circuit FSL. The control signal has such a progression that the transfer device SW is switched into the switch position opposite that illustrated in FIG. 2 during the first two clock pulses of the clock pulses output from the AND gate GU2. In this other switch position, the switch output of the transfer device is connected to the output of the bit group transmission device FSG which emits a bit group encompassing two very specific bits x and y in the present case due to its selection proceeding from the output of the speed decoder circuit GDS. Under the influence of the two clock pulses applied to the clock input of a trigger circuit SDE, the phasing circuit, the two bits s, y of this bit group are input into the circuit and are emitted therefrom at the output by way of the transmission line. Subsequently, the transfer device SW is then again located in the switch position shown in FIG. 2 in which the data bits previously written into the transmission data buffer SDP are read and output via the phasing circuit SDE onto the transmission line.

Both the two bits output from the bit group transmission device FSG, as well as the bits read from the transmission data buffer SDP, appear on the transmission line or, respectively, at the output SDB with the clock rate of the clock pulses supplied to the terminal TU. This clock rate can be, for example, 64 kHz.

In order to distinguish the aforementioned bits read from the transmission data buffer SDP, these being data signal bits, from bits that do not form data bits which are otherwise transmitted via the transmission line, the bit group transmission device FSG emits differing bit groups at the various times at which it is connected at its output to the circuit SDB via the transfer device SW. In the case of the data signal bits to be transmitted following such a bit group, the bit group transmission device emits two identical bits, for example "0, 0" or "1, 1", as the bits x, y. In all other cases, the appertaining bit group transmission device FSG emits two respectively different bits x, y as a bit group, for example "0, 1" or "1, 0". However, it is also possible to have, respectively, only 1-bits output by the bit group transmission device FSG as filler bits, whereby these bits then identify the individual, following bits as communications signal bits. This, for example, is the case when the communications signal bits appear with a clock bit rate of 56 kbit/s and the bit rate on the transmission line amounts to 64 kbit/s.

In order to be able to emit the aforementioned differing bit groups, the bit group transmission device FSG is supplied with corresponding control signals from the output of the speed decoder circuit GDS. As a consequence of the signal supplied thereto at its input, in particular, the speed decoder circuit can now put such differing output signals that a decision can be made in the bit group transmission device FSG whether a bit group for the identification of filler bits or a bit group for the identification of data signal bits is to be subsequently output. It should be noted at this point that the output signal of the trigger circuit FSS could also be employed under given conditions for this control of the bit group transmission device FSG. In response to the appearance of the leading edge of the output signal respectively output by the trigger circuit FSS, the bit group transmission device FSG would then output a bit group such as identifiers of the bits following thereupon at the output terminal SDB and, therefore, on the transmission line as data signal bits. In all other cases, the bit group transmission device FSG could respectively emit 1-bits and 0-bits in the alternating succession in order to form bit groups from such bits with which the bits following thereupon at the output terminal SDB and, therefore, on the transmission line are identified as filler bits.

It is assured by means of the measures set forth above that the bits output from the output terminal SDB of the bit rate adaptation circuit BRAS illustrated in FIG. 2 are identified either as data signal bits or as filler bits. Together with their bit groups, these bits are respectively combined into 8-bit data signal or blank envelopes. Thereby transmitted as filler bits are output signals of the transmission data buffer SDP which this outputs as, so to speak, continuous "1" or "0" signals when it is not being operated in the read mode. It should be noted at this point that it is definitely possible to identify those envelopes containing the status information or signaling information that are transmitted in addition to data signal envelopes as such via the separate control input X. In this case, the terminal of the transfer device SW connected to the output of the transmission data buffer SDP would also have to be connected to a separation information signal outputting device.

FIG. 4 is a block diagram of the possible structure of the bit rate adaptation circuit BRAE connected in the receiving branch of the circuit arrangement of FIG. 1. This bit rate adaptation circuit BRAE comprises a receiving data buffer EDP which has its write input connected to a terminal EDB to which the bits appearing on the appertaining receiving line (EL in FIG. 1) are supplied. These bits appear, for example, with a bit rate of 64 kbit/s.

The receiving data buffer EDP has its write clock input connected by way of a line TES to the output of a NAND gate GU3. The NAND gate GU3 has one of its inputs connected to a terminal TU to which clock pulses are supplied with the bit rate prevailing on the transmission link or, respectively, receiving line. Since the bit rate adaptation circuit BRAE illustrated in FIG. 4 is used in common with the bit rate adaptation circuit BRAS illustrated in FIG. 2 in the circuit arrangement shown in FIG. 1, the terminal TU of the bit rate adaptation circuit BRAE can be connected to the correspondingly-reference terminal of the circuit arrangement shown in FIG. 2.

The other input of the NAND gate GU3 is connected to the outputs ab of a write enable trigger circuit FES which has its setting input S connected to the output of a speed decoder circuit GDE and has its reset input R connected to a terminal ORR1. The terminal ORR1 can be connected to a correspondingly-referenced terminal ORR1 of the bit rate adaptation circuit BRAS shown in FIG. 2.

At the input side, the speed decoder circuit GDE is connected to the terminals GSE, ORR2 and ORR3 of the bit rate adaptation circuit BRAE. These terminals can also be connected to correspondingly-referenced terminals of the bit rate adaptation circuit BRAS illustrated in FIG. 2. A so-called filler/status bit evaluation circuit FSB, further, is connected to the two latter terminals ORR2 and ORR3 of the bit rate adaptation circuit BRAE as well as to the terminal EDB, this circuit FSB initializing the decoder circuit GDE at its output side only during certain time intervals, as shall be explained in greater detail below.

The receiving data buffer EDP has its read clock input connected by way of a line TEL to the output of an AND gate GU4, the AND gate GU4 has one of its inputs connected to a terminal Nta which may be connected to the correspondingly-referenced terminal of the bit rate adaptation circuit BRAS of FIG. 2. The other input of the AND gate GU4 is connected to the output of a read enable trigger circuit FEL which has its clock input connected to a terminal $\overline{\text{NTa}}$. The terminal $\overline{\text{NTa}}$ may be connected to a correspondingly-referenced terminal of the bit rate adaptation circuit BRAS of FIG. 2. The signal input of the trigger circuit FEL is connected by way of a line PG to a control output of the receiving data buffer EDP.

The receiving data buffer EDP has its data bit output connected to a signal input of a receiving data phasing circuit EDE which may be a clock-controlled bistable flip-flop. This flip-flop has its clock input connected to the output of the AND gate GU4. The signal output of the flip-flop EDE is connected to a terminal EDN of the bit rate adaptation circuit BRAE. Receive data are output by way of this terminal EDN with the net bit rate which may amount to, for example, 9.6 kbit/s.

The structure of the circuit arrangement illustrated in FIG. 4 having been explained above, the manner of operation of the circuit arrangement shall now be considered upon utilization of the pulse diagram illustrated in FIG. 5. First, however, it should be noted that the pulses, or, respectively, pulse sequences shown in the various lines are referenced with reference characters which are employed for the designation of corresponding circuit points or, respectively, trigger elements in FIG. 4 at which or at whose output the appertaining pulses or pulse sequences appear. In addition, the uppermost line of the pulse diagram of FIG. 5 illustrates the course of the clock pulses which appear at the clock terminal T of the bit rate adaptation circuit BRAS illustrated in FIG. 2. These pulses are of significance in the present case insofar as the appearance of further pulses which control the circuit arrangement of FIG. 4 is interrelated with their appearance.

According to FIG. 5, bits appear at the input terminal EDB in the rhythm of the clock pulses appearing at the terminal TU. The appertaining bits are either a matter of data signal bits belonging to data signal envelopes or of bits belonging to the blank envelope. The various envelopes are respectively identified by two bit groups encompassing two bits x, y as was explained in conjunction with FIGS. 2 and 3.

With the appearance of a bit group x, y identifying an envelope as a data signal envelope, the evaluation circuit FSB emits an output signal at its output in response to which the recorded circuit GDE effects the setting of the trigger circuit FES. The trigger circuit FES is set during the duration of 6 bits subsequently appearing. Thereafter, it is supplied from the terminal ORR1 with a pulse causing resetting thereof.

Given a trigger circuit FES situated in its set condition, six clock pulses appear at the output of the NAND gate GU3 in the present case, these six clock pulses being supplied by way of the line TES to the write clock input of the receiving data buffer EDP. Accordingly, only the data signal bits which are being supplied by way of the terminal EDB to the receiving data buffer EDP are written into the appertaining receiving data buffer EDP. The bits belonging to the blank envelopes, by contrast, are left unconsidered; they are not written into the receiving data buffer EDP.

After the receiving data buffer EDP is loaded with data signal bits, it emits an output signal by way of the line PG which is supplied to the signal input of the trigger circuit FEL. The trigger circuit FEL is constructed such with the next clock pulses supplied to its clock input that it drives the AND gate GU4 into its transmissive condition. The AND gate GU4 therewith emits pulses by way of the line TEL which are supplied to the terminal NTa of the bit rate adaptation circuit BRAE. These clock pulses are to be viewed as read pulses which may be supplied with a clock rate of, for example, 9.6 kHz because reading of the data signal bits located in the receiving data buffer EDP and the clock-controlled emission of these data signal bits via the trigger circuit EDE to the output terminal EDN.

It proceeds from FIG. 5 in this context that further data signal bits are again written into the receiving-data buffer EDP when the data signal bits previously written into the receiving data buffer have just been read. This means that the appertaining receiving data buffer EDP operates alternately in the write mode and the read mode.

In conclusion, it should also be pointed out that the data signal bits that stem from text or, respectively, data terminal equipment or, respectively, that are to be supplied to such equipment which work, for example, with 9.6 kbit/s or with 19.2 kbit/s or 38.4 kbit/s or 48 kbit/s or 56 kbit/s can be transmitted by a circuit arrangement constructed in accordance with the present invention on a 64 kbit/s transmission line. However, it is also possible to transmit data signal bits between text or, respectively, data terminal equipment that operate with other bit rates that are divisor-alien with the bit rate prevailing on the transmission link via a transmission link such as, for example, the aforementioned 64 kbit/s transmission link. Given non-transgression of a predetermined bit rate difference between a first bit rate with which the data signal bits are output from the text or, respectively, data terminal equipment and a second bit rate which prevails on a transmission link, the data signal bits to be transmitted via this transmission link are first combined with additional filler bits to form envelopes respectively encompassing a prescribed plurality of, for example, 8 bits, these envelopes being identified as data signal envelopes by their filler bits belonging to a first bit group. The bits of these data signal envelopes are then transmitted via the transmission link with the second bit rate. The utilization of the above-indicated numerical values, the bit rate difference upon whose non-transgression one proceeds in this manner, lies at 8 kbit/s.

When the prescribed bit rate difference between the first bit rate and the second bit rate is transgressed, then the data signal bits and the bits of first bits groups identifying the data signal bits as belonging to data signal envelopes are combined with bits of separate envelopes which respectively contain a second bit group identifying them as blank envelopes. All of these bits are then transmitted via the transmission link with the second bit rate. When the above-indicated numerical values are utilized, one proceeds in this manner in those cases wherein the data signal bits appear when a bit rate, for example, 9.6 kbit/s or 19.2 kbit/s or 38.4 kbit/s or 48 kbit/s and the bit rate prevailing on the transmission link amounts to, for example, 64 kbit/s.

The following should be noted in addition to the aforementioned explanations. The speed transfer device GSU illustrated in FIG. 1 can, for example, be a matter of a PLL (phase locked loop) circuit which is supplied with clock and speed signals via the clock signal channel TGS from a central clock generating device. One can thereby proceed such that the required station signals are transmitted to the central clock generating device by the setting of the setting switch SG. This central clock generating device emitting the necessary clock and speed signals in response thereto.

The exchange-oriented auxiliary controller device VZS illustrated in FIG. 1 can be a matter of the control portion of a commercially-available data circuit terminating equipment such as obtainable, for example, from Siemens Corporation, Iselin, N.J., under the designation DFG 9600 E-1. The net bit clock generating circuit NTE illustrated in FIG. 2 can be a matter of a controlled clock generator.

The bit group transmitting device FSG illustrated in FIG. 2 can be a register arrangement which is capable of transmitting different bit groups in response to its respective selection.

The transmission data phasing circuit SDE illustrated in FIG. 2, finally, can be formed by a clock-controlled bistable circuit.

It should be noted in conjunction with FIG. 4 that the receiving bit evaluation circuit FSB shown therein can basically be realized by the decoder circuit.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for the transmission of data signal bits occurring with a first bit rate from a transmission device via a transmission link to a receiving device in a bit stream having a second bit rate which is higher in comparison to the first bit rate, comprising the steps of:

combining the data signal bits to be transmitted with additional filler bits to form envelopes respectively encompassing a prescribed plurality of bits when a prescribed bit rate difference between the first bit rate and the second bit rate is not transgressed, and identifying the envelopes as data signal envelopes by their filler bits belonging to a first group;

transmitting the data signal envelopes over the transmission link at the second bit rate;

given transgression of the prescribed bit rate difference between the first bit rate and the second bit rate, combining the bits of first bit groups identifying the signal bits as belonging to data signal envelopes with bits from separate envelopes which respectively contain second bit groups identifying them as blank envelopes; and transmitting the blank envelopes over the transmission link at the second bit rate.

2. The method of claim 1, and further comprising the steps of:

forming the first bit group by a standard bit (X); and forming the second bit group by two identical bits (X,Y).

3. The method of claim 1, and further comprising the steps of:

forming the first bit group by two different bits (X,Y); and forming the second bit group by two identical bits (X,Y).

4. A circuit arrangement for transmitting data signal bits occurring in a first bit rate from a transmission device via a transmission link to a receiving device in a bit stream having a second bit rate which is higher in comparison to the first bit rate, said circuit arrangement comprising:

a transmitting device, a receiving device and a transmission link interconnecting said transmitting device and said receiving device, said transmitting device operable to receive data bits at a first bit rate and transmit the data bits over said transmission link at a second bit rate which is higher than the first bit rate and said receiving device operable to receive the data bits from said transmission link at said second bit rate and output the same at said first bit rate;

said transmitting device connected to said transmission link and comprising a transmission data buffer for intermediately storing the data signal bits received at the first bit rate and operable to emit the data signal bits at the second bit rate, said transmitting device comprising a bit group emission means connected to said transmission data buffer for emitting a fixed bit group (X; X, Y) from at least two different bit groups for transmission via said transmission link either before or after reading of a fixed plurality of bits from said transmission data buffer, whereby the one bit group together with its bits transmitted from the transmission data buffer is identified as belonging to a data signal envelope, whereas the other bit group together with its bits transmitted from the transmission data buffer is identified as belonging to a blank envelope;

a first control arrangement in said transmission device connected to said transmission data buffer and operable, after respective identification of the fixed plurality of data signal bits to be accommodated in an envelope to produce a control signal for reading of the appertaining bits from said transmission data buffer and controlling the emission of the one bit group or the other bit group before or after reading;

a receiving data buffer in said receiving device connected to said transmission link for intermediately storing the data bits received from said transmission link at the second bit rate; and a second control arrangement in said receiving device connected to said receiving data buffer for controlling the storage of the data signal bits received at the second bit rate such that only the data signal bits belonging to the data signal envelope are stored in and then read from said receiving data buffer.

5. The circuit arrangement of claim 4, wherein:

said first control arrangement of said transmission device comprises a counter for counting a predetermined number of data signal bits to be accommodated in an envelope and operable to control the reading of the data signal bits previously deposited in said transmission data buffer and the transmission of a first or second bit group by said bit group emission device.

6. The circuit arrangement of claim 5, wherein:

said first control arrangement of said transmission device comprises a phase matching device for controlling the times at which the bits stored in said transmission data buffer are read.

7. The circuit arrangement of claim 6, wherein:

said first control arrangement of said transmission device comprises a signal emission device connected to and controlled by said counter for defining the time ranges within which a data signal envelope or a blank envelope is output.

8. The circuit arrangement of claim 7, wherein:
said second control arrangement of said receiving device comprises a bit group evaluation device and a signal emission device for controlling the writing and reading of the respective data signal bits into and out of said receiving data buffer, respectively.

9. The circuit arrangement of claim 8, wherein:
said signal emission device of said receiving device includes means for outputting its write or, respectively, read signals, a logic element for receiving the write and read signals and clock pulses at the second or, respectively, first bit rate.

10. The circuit arrangement of claim 9, wherein:
said second control arrangement of said receiving device comprises a counter for defining the times at which data signal bits are capable of appearing in individual envelopes.

11. The circuit arrangement of claim 10, wherein:
each of said first and second control arrangements respectively comprises a speed decoder operable in response to the feed of a signal at a first bit rate to allow the respective signal emission device for reading data signal bits from the transmission data buffer or, respectively, writing data signals into said receiving data buffer to be effectively controlled.

* * * * *